(12) United States Patent
Kurtenbach et al.

(10) Patent No.: US 8,522,159 B2
(45) Date of Patent: *Aug. 27, 2013

(54) SYSTEM FOR ACCESSING A LARGE NUMBER OF MENU ITEMS USING A ZONED MENU BAR

(75) Inventors: Gordon Kurtenbach, Toronto (CA); George W. Fitzmaurice, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 1022 days.

This patent is subject to a terminal disclaimer.

(21) Appl. No.: 12/119,167

(22) Filed: May 12, 2008

(65) Prior Publication Data

US 2008/0216014 A1    Sep. 4, 2008

Related U.S. Application Data

(63) Continuation of application No. 11/063,865, filed on Feb. 23, 2005, now Pat. No. 7,555,726, which is a continuation of application No. 10/178,026, filed on Jun. 24, 2002, now Pat. No. 6,915,492, which is a continuation of application No. 09/119,654, filed on Jul. 21, 1998, now Pat. No. 6,414,700.

(51) Int. Cl.
*G06F 15/00* (2006.01)
*G06F 13/00* (2006.01)

(52) U.S. Cl.
USPC .......................................... 715/810; 715/841

(58) Field of Classification Search
USPC ................. 715/711–715, 751–753, 804, 810, 715/841, 762–765, 803, 808
See application file for complete search history.

(56) References Cited

U.S. PATENT DOCUMENTS

| 5,442,788 A | 8/1995 | Bier |
| 5,561,811 A | 10/1996 | Bier |
| 5,596,699 A * | 1/1997 | Driskell ......................... 715/834 |
| 5,666,499 A | 9/1997 | Baudel et al. |

(Continued)

OTHER PUBLICATIONS

Bier, E., A., Stone, M., C., Fishkin, K., Buxton, W., Baudel, T., (1994) A Taxonomy of See-Through Tools. Proceedings of the ACM CH'94 Conference on Human Factors in Computing Systems, 358-364.

(Continued)

*Primary Examiner* — Cao "Kevin" Nguyen
(74) *Attorney, Agent, or Firm* — Staas & Halsey LLP

(57) ABSTRACT

A system that includes a pop-up graphical user interface that includes menu bars overlapping marking menu zones. The interface pops up at the current position of the cursor when the space bar is held down. The menu bars are positioned around a central marking zone with the common menu bars located above the central zone and task specific menu bars located below the central zone. The common application menu bar is positioned outer most and the common window menu bar is located inner most. The menu bars are sized in a "stair-step" pattern and the commands therein are left and right justified to fill the menu bar evenly. The menu bar menu items are accessed just like menu bar items typically found at the top of windows. The menu bars mimic the menu bars that a user may need to use during tasks that users typically perform using the menu bars found in application windows. The zones are divided into a central zone and four outer zones where user customizable marking menus are activated when a mouse button is held down while the cursor is in one of the zones.

6 Claims, 13 Drawing Sheets

(56) References Cited

U.S. PATENT DOCUMENTS

| | | | |
|---|---|---|---|
| 5,689,667 A | | 11/1997 | Kurtenbach |
| 5,689,668 A | | 11/1997 | Beaudet et al. |
| 5,701,424 A | * | 12/1997 | Atkinson .................... 715/808 |
| 6,023,267 A | | 2/2000 | Chapuis et al. |

OTHER PUBLICATIONS

Brooks, P. (1994). Adding Value to Usability Testing. in Usability Inspection Methods, Nielsen, J. & Mack R. (Eds). John Wiley. 255-271. see p. 262.

Carroll, J., M., & Carrithers, C. (1994) Training Wheels in a User Interface. Communications of ACM, 27, 800-806.

Harrison, B. & Vicente, K. (1996) An Experimental Evaluation of Transparent Menu Usage. Proceedings of the ACM CHI'96 Conference of Human Factors in Computing Systems, 391-398.

Gould, John (1988). How to Design Usable Systems. in Handbook on Human-Computer Interaction, M. Helander (Editor), North-Holland. Elsevier. 1988. pp. 757-789. Reprinted in Readings in Human Computer-Interaction: Towards the Year 2000. Baeckers, R., Grudin J. Buxton, W. & Greenberg, S. (Eds), Morgan Kaufmann, 1995. 93-121. See p. 113.

Jeffries, R. (1994). Usability Problems Reports: Helping Evaluators Communicate Effectively with Developers. in Usability Inspection Methods, Nielsen, J. & Mack R. (Eds. John Wiley. 273-294. see p. 278.

Kiger, J.L. (1984) the Depth/Breadth Tradeoff in the Design of Menu Driven User Interfaces. International Journal of Man Machine Studies, 20, 210-213—Abstract.

Kurtenbach, G. Buxton, W. (1993) The limits of expert performance using hierarchical marking menus. Proceedings of CHI '92 Conference on Human Factor in Computing, 482-487.

Kurtenbach, G., Fitzmaurice, G., Baudel, T. & Buxton, B. (1997) The Design of a GUI Paradigm based on Tablets, Two-hands, and Transparency. Proceedings of the ACM CHI'97 Conference on Human Factors in Computing Systems, 35-42.

Landauer, T.K. & Nachbar, D.W. (1985) Selection from Alphabetic and Numeric Trees Using a Touch Screen: Breadth, Depth and Width. Proceedings of the ACM CHI'85 Conference of Human Factors in Computing Systems, 73-78.

Lewis, C. & Rieman, J. (1993). Getting to Know Users and Their Tasks. in Task Centered User Interface Design, a practical introduction. Reprinted in Readings in Human Computer-Interaction: Towards the Year 2000. Baecker, R., Grudin, J. Buxton, W. & Greenberg, S. (Eds), Morgan Kaufmann, 1995. 122-127 see p. 124, col. 2.

Mackenzie, I.S., & Buxton, W. (1992) Extending Fitts' Law to Two-dimensional Tasks. Proceedings of Acm Chi '92 Conference on Human Factors in Computing Systems, 21 226.

Sears, A. & Shneiderman, B. (1994) Split menus: Effectively using selection frequency organize menus. ACM Transactions on Computer-Human Interaction, vol. 1, #1 (Mar. 1994), 27-51. also available oneline at ftp://ftp.cs.umd.edu/pub/papers/papers/2997/2997.ps.Z.

U.S. Appl. No. 11/063,865, filed Feb. 23, 2005, Kurtenbach et al., Alias Systems Corp.

Kurtenbach, G., et al., The HotBox: Efficient Access to a Large Number of Menu-items, CHI 99 May 15-20, 1999, pp. 231-237.

* cited by examiner

SYSTEM FOR ACCESSING A LARGE NUMBER OF MENU ITEMS USING A ZONED MENU BAR

CROSS-REFERENCE TO RELATED APPLICATIONS

This application is a continuation of application Ser. No. 11/063,865 filed Feb. 23, 2005 now U.S. Pat. No. 7,555,726; which is continuation of application Ser. No. 10/178,026, filed Jun. 24, 2002, now U.S. Pat. No. 6,915,492; which is a continuation of application Ser. No. 09/119,654, filed Jul. 21, 1998 now U.S. Pat. No. 6,414,700, all of which are incorporated by reference herein.

BACKGROUND OF THE INVENTION

1. Field of the Invention

The present invention is directed to a graphical user interface that presents the user with a large number of menu items and, more particularly, to an interface that provides marking menu features combined with menu bar features where the menu bars spatially mimic the menu bars of the windows of the application and where the features allow fast access to a large number of menu items.

2. Description of the Related Art

Today's three-dimensional (3D) computer animation and design applications are professional tools that present many challenging user interface requirements. First and foremost, these systems allow complex and sophisticated controls over 3D data and the behavior of 3D data over time. This sophisticated functionality results in an application with hundreds of commands. Professional users also require efficient access to commands since they may spend a large number of hours operating the application under strict deadlines. Therefore, even small performance improvements (like menu selection speed) can dramatically affect user efficiency and their perceived efficiency of the application. Another major design requirement for this class of application is to reduce the complexity presented by the user interface whenever possible. The nature of data and the operations on the data is, by itself, complex. Adding in a complicated user interface would only further increase the user's cognitive load. These challenges produce three basic problems for the traditional graphic user interface (GUI) which are discussed below.

A typical animation and design application has more than 1000 commands which can be found in the menu bars. The number of commands in these applications is expected to increase as newer versions are produced. At the very most 20 pull-down menus can be placed in a menu bar that span the entire length of a high resolution screen (1280 pixels across). With more than 1000 commands this results in menus that on average have 50 items each in them. In practice, this results in information overload. What is needed is an interface that provides access to a large number of commands without subjecting the user such an overload.

Today's users want fast access to frequently used commands. In traditional graphical user interfaces (GUIs), hot-keys, or menu accelerators, are used for the frequently used functions. However, in most design/animation shops the set of frequently used commands varies between users and from task to task. Furthermore, there is a limit to the number of "fast" hot-keys. Some hot-key combinations are hard to physically articulate (for example, ctrl-alt-P). Other hot-keys are hard to remember ("Why is ctrl-d mapped to "Create IK Joint?"). Ultimately, as the menu structures grow in size, it becomes hard to represent the structure of menus in hot-key mappings. What is needed is a fast access interface that allows easy variation in the frequently used commands.

To reduce the complexity of the user interface, it is preferred that a single interaction technique be available for accessing all the commands. In a traditional GUI, large numbers of commands are sometimes absorbed by placing them in different spots (for example, different tool pallets, different pop-up menus, etc., depending on where you click or what button is pressed). The functionality in some animation/design applications is sufficiently complex that it is important for commands to be grouped by function not by interaction technique. For example, typically GUIs place functional modes into tool bars and one-shot actions into the menus. However, from a functional point of view a particular tool and action may be closely related (for example, the "create curve with points" tool and the "attach curves" action). What is needed is an interface that can use a single interaction technique yet allows grouping by function.

It is also important to provide a menu access technique that unifies novice and expert behaviors. In a traditional GUI, novice and expert operation of the interface can be dramatically different. For example, a novice user may exclusively use only the menu bar while an expert may almost exclusively use hot-keys. The radical difference between these two behaviors makes graduating from novice to expert behavior an explicit (and extra) effort. What is needed is a menu access interface where novice operation is a rehearsal of expert behavior. Essentially, what is needed is for novices and experts to use the same menu access technique perhaps differing only in speed of operations.

SUMMARY OF THE INVENTION

It is an object of the present invention to provide an interface that allows access to a large number of commands without subjecting the user to information overload.

It is another object of the present invention to provide fast access and easy variation in the frequently used commands.

It is also an object of the present invention to provide a single interaction technique allowing grouping by function.

It is a further object of the present invention to provide an interface that is used in essentially the same way by novices and experts.

It is an additional object of the present invention to provide a display that mimics the appearance and interaction of the typical menu bars.

The above objects can be attained by a system that includes a pop-up graphical user interface that includes menu bars and marking menu zones where the menu bars overlap the zones. The menu bars are positioned around a central marking zone with the application menu bar positioned outermost and the window menu bar located innermost and both on an upper side and task menu bars located on the lower side. The menu bars are arranged in a "stair step" pattern and commands are spread uniformly or justified within each menu bar. The zones form a visual square and are divided into a central zone and four outer zones where user customizable marking menus are activated when a mouse button is held down while the cursor is in one of the zones.

These together with other objects and advantages, which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

The zoned menu bar interface of the present invention is an interactive interface which supports fast access to a large number of menus items utilizing the user interface metaphor of multiple menu bars which mimic the appearance and interaction of traditional menu bars. It also unifies access to menu bar items and user customizable marking menus. The invention includes: a method of accessing multiple menu bars simultaneously; a single and simple access method for simultaneous presentation and access to user customizable marking menus and menu bar items; a method of utilizing zones of the screen relative to the cursor for accessing multiple marking menu sets; and a method for creating a visually pleasing layout of menu bars and marking menu zones that also support efficient access.

The present invention allows the presentation and access to over 1000 menu commands, where this number of commands would overload the traditional graphic user interface (GUI) menu bar. The invention provides fast command access without having to resort to hot-keys. The invention allows the users to create their own marking menus which are used for fast command access.

Figure 1:
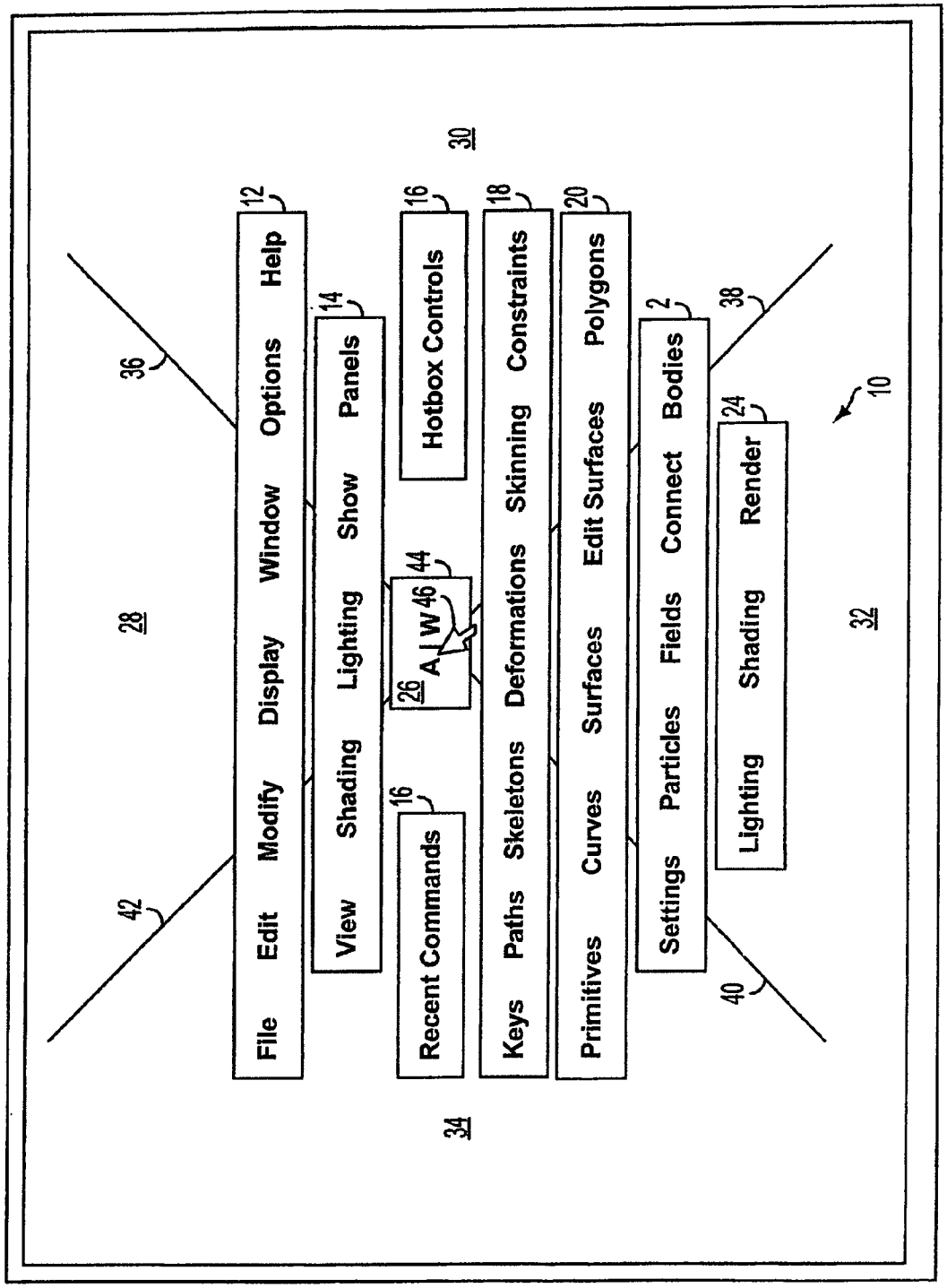
FIG. 1 depicts a zoned menu bar interface according to the present invention.

The graphic user interface (GUI) of the present invention, as depicted in FIG. 1, is a pop-up zoned menu bar interface 10 which includes menu bars 12-24 and marking menu zones 26-34 divided by zone boundaries 36-44. The interface 10 can be called a "Hotbox" as it is box shaped and functions rapidly. The zoned menu bar interface 10 pops-up under the cursor 46 when the interface 10 is selected. The menu bars 12-24 are used like the menu bars that appear at the top of typical windows type interfaces. For example, when the cursor is placed on a menu item and a mouse button is depressed a linear menu (or a radial menu) for that item pops up. The marking menu zones 26-34 exist in areas that lie between/outside the menu bars 12-24. The marking menu zones 26-34 also operate like the marking menus found in a typical marking menu interface. For example, a marking menu item is selected when a stroke is made by the cursor when it is in one of the marking menu zones. Note that the menu marking for a zone is not activated when the cursor is within the zone but over a menu bar, the menu for the menu bar item under the cursor is activated.

Figure 2:
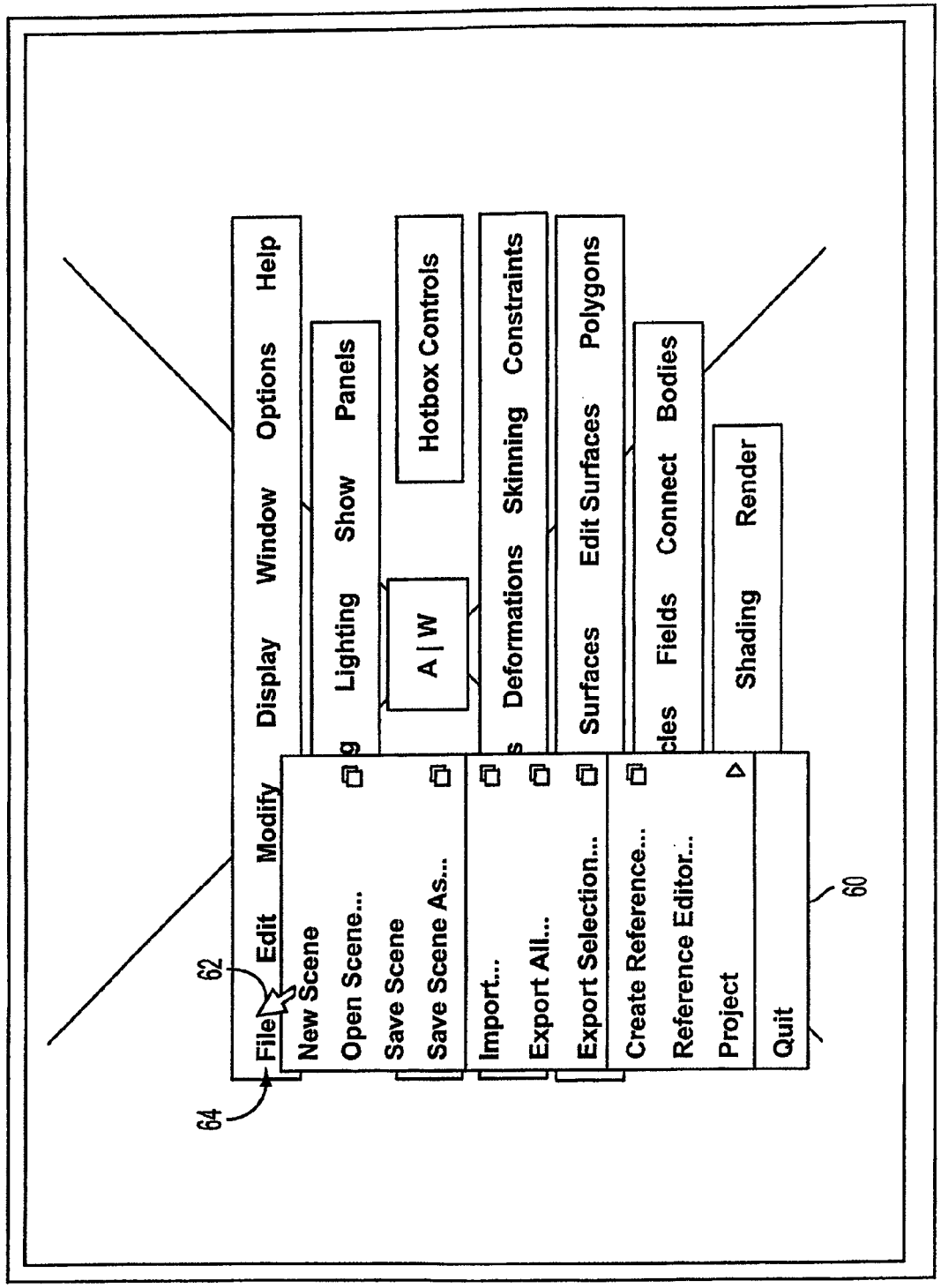
FIG. 2 depicts a specific pop-down menu of the invention.

The zoned menu bar interface 10 works as follows. To display the interface 10, the user holds down a key on the key board, preferably the space-bar (with their non-dominant hand), when the cursor is in a display window. Other keys, such as the "h" key, could be used and other devices than the key board, such as one of the inputs of a mouse, could also be used to select the interface 10. The interface 10 "instantly" appears when the key is depressed, centered at the location of the cursor 46. The "rows" of the interface 10 (see FIG. 1) behave like traditional menu bars where an individual menu 60 can be popped down like traditional menu bar menus by moving the mouse (with the dominant hand) so the cursor 62 is over a menu label 64 and pressing any mouse button, as depicted in FIG. 2.

Figure 3:
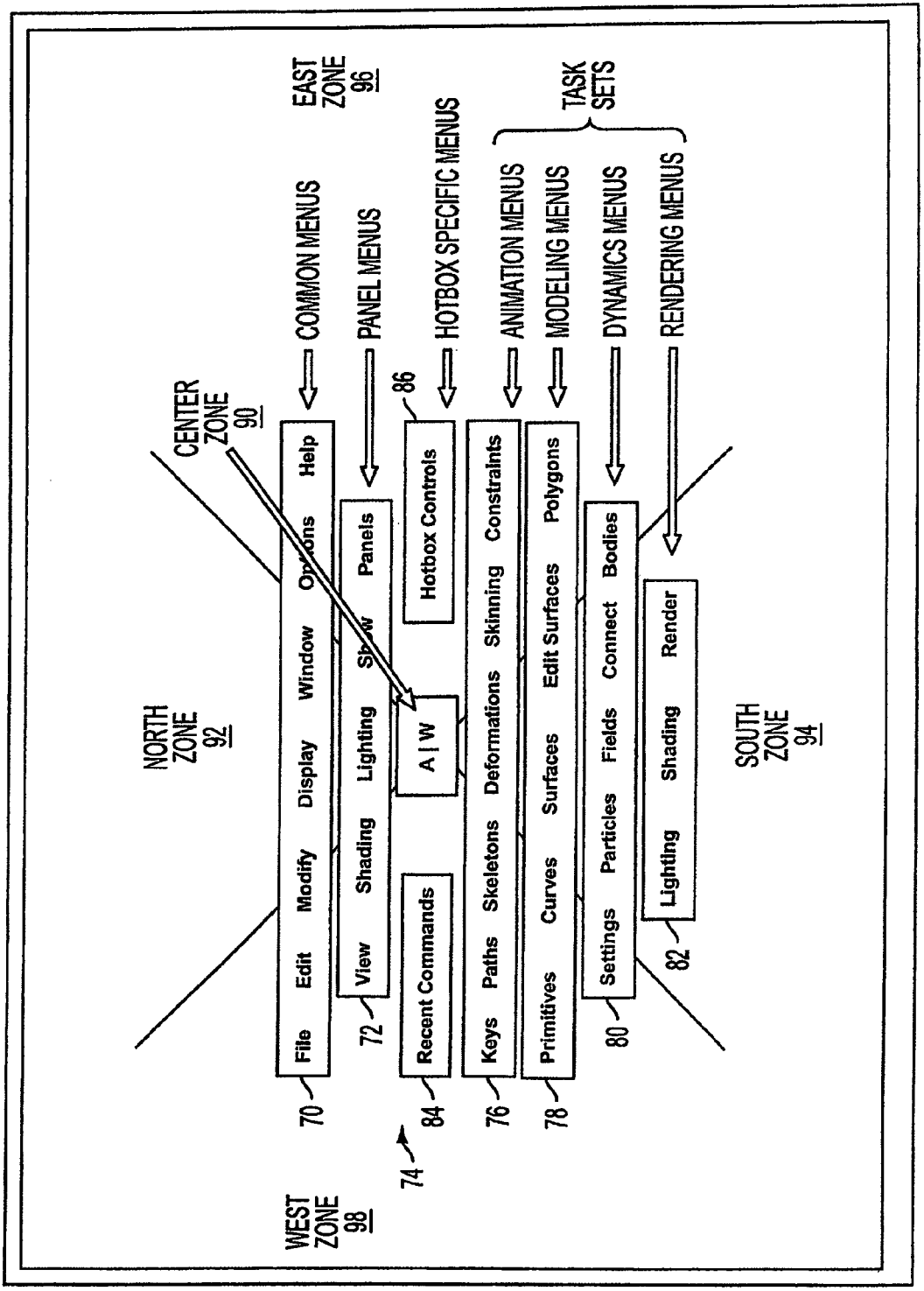
FIG. 3 illustrates how the interface of the present invention is preferably organized.
Figure 4:
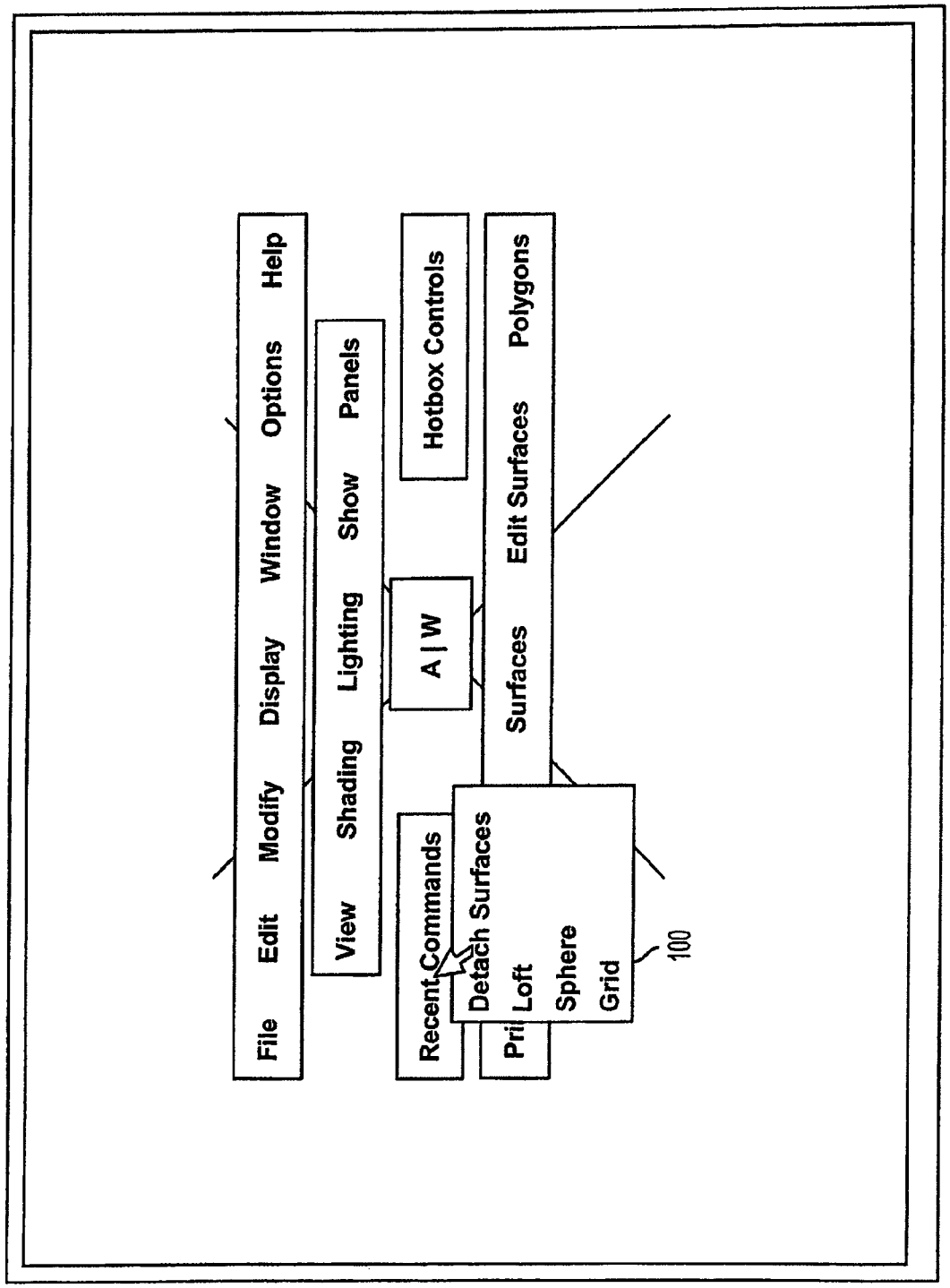
FIG. 4 depicts a recent command pull down menu of the invention.
Figure 5:
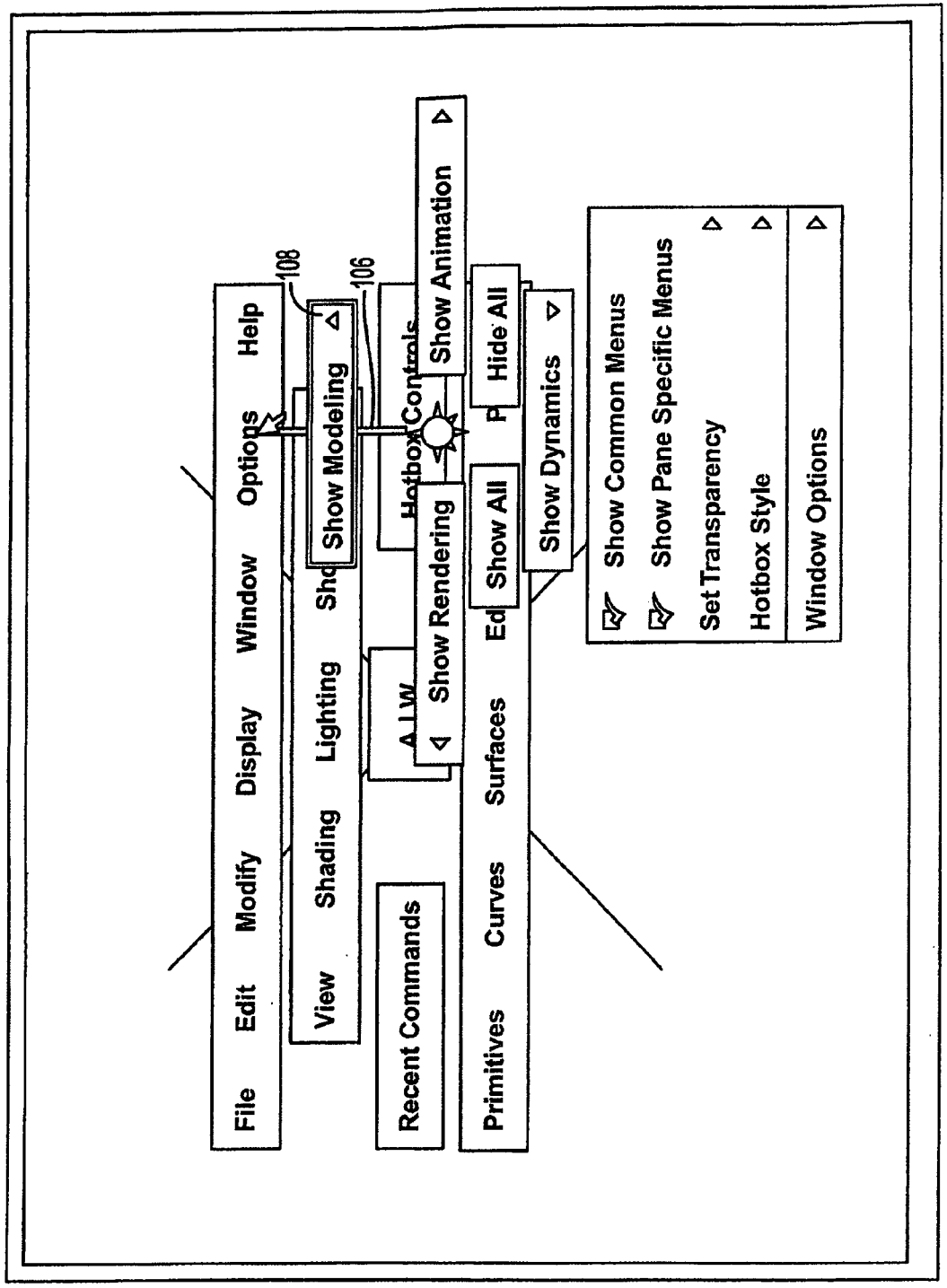
FIG. 5 illustrates a marking menu accessible through a menu bar menu item.

Each row of the zoned menu bar interface 10 preferably corresponds to a particular set of menus, as depicted in FIG. 3. The top row 70, is referred to as the "common" row and preferably corresponds to menus commonly found in most applications' main window menu bar (e.g., File, Edit, ... ). The next row 72 down, called the panel row (or window pane row), preferably shows the items in the menu bar for the window in which the cursor currently resides. Below the center row 74 of the interface 10 are rows of menus, called the task menu set, which are preferably specific to certain computer tasks, such as graphics or word processing tasks. The user can customize the order of these menu bars, particularly the task set, so that the most often used bar is closer to the center. The center row 74 includes a bar 84 with the menu label "Recent Commands" which when selected, as depicted in FIG. 4, preferably displays a list 100 of recent commands issued by the user and allows a user to repeat a command without having to relocate the command in the interface 10. The other menu 86 in the center row 74 (see FIG. 3), "Hotbox Controls" allows the user to control which rows of the interface 10 are displayed. This menu 86 is preferably a marking menu. In FIG. 1, all the rows of the interface 10 are displayed. Using the marking menu 86 a user can quickly display or hide specific rows. FIG. 5 shows an example of changing the display of rows where a marking stroke 106 has been made toward the "Modeling" selection 108.

Besides presenting the user with rows of menus the zoned menu bar interface 10 divides the entire screen into five zones (see FIG. 3): center 90, north 92, south 94, east 96 and west 98. Each of the these zones can have a different user customizable marking menu which can be accessed simply by pressing down a mouse button when the cursor is in the zone. The use of marking menus provides fast and efficient command access compared to traditional linear menus.

The zoned menu bar interface 10 remains displayed as long as the specified key, such as the space-bar, is kept pressed. This allows a user to perform a series of commands without having to re-invoke the interface 10. Once the specific key is released the interface 10 disappears.

The interface 10 (see FIG. 3) is optimized for menu access speed by supporting multiple menu access speeds. The fastest level of access is supported by the center zone 90 since the user does not have to move the cursor to invoke the menu—the center zone pops up under the cursor so the user can immediately select from the center marking menus. The direction zones (north 92, south 94, east 96 and west 98) are the next fastest to access. In this case, the user has to move the cursor to the outer zone but the zone is very large therefore movement to the zone can be performed very quickly. The menu bars (for example, 70) provide the next fastest access.

Accessing the menu bars is slightly slower than the marking zones since the cursor must be moved to a much smaller area. Even within the menu bars, the menu bars that are closer to the center of interface 10, such as 72 and 76, can be accessed more quickly than menu bars on the outside, such as 82.

Figure 6:
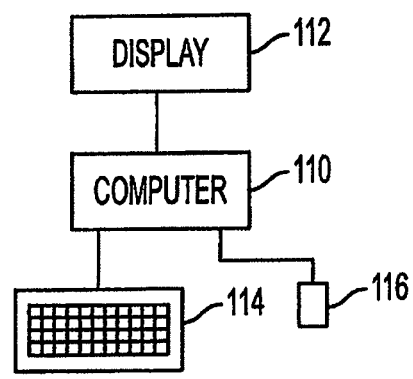
FIG. 6 illustrates the hardware of the present invention.

The present invention is implemented in a computer system, such as depicted in FIG. 6, which includes a computer 110, such as the O2 available from Silicon Graphics, Inc. The computer 110 includes the computer readable media storage, such as disk storage, suitable for storing the processes of the present invention. Such media, as well as downloading over a network, such as a packet switched network, can be used to distribute the processes of the invention to customers. A display 112 is provided for displaying the zoned menu bar interface 10. A keyboard 114, or other input device, as discussed above and used for selecting the interface 10, is also provided. A mouse 116, or other input device, such as a stylus and tablet, that can control the position of a cursor, is used for selecting items in the interface.

Figure 7:
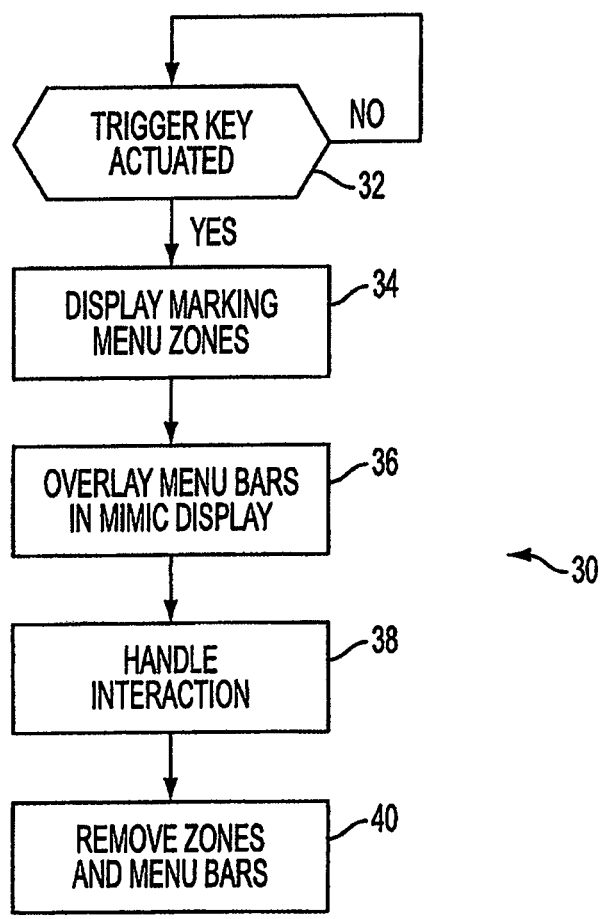
FIG. 7 shows the flow of control in the present invention.

The process 30 of the present invention begins with the system looking 32 for the trigger key being activated, as depicted in FIG. 7. When the trigger key, such as the space bar, is held down as the activation signal, the system first produces 34 the marking menu zones on the display centered at the current position of the cursor. This operation is described in greater detail in the pseudo code of the attached Appendix. Next, the system overlays 36 the menu bars on top of the zones. The preferred layout of the menu bars will be discussed in greater detail later herein and additional details concerning the process of creating the layout can also be found in the Appendix. Once the zoned menu bar interface 10 has been created, the system looks for and handles 38 an interaction. That is, if the user positions the cursor over one of the menu bar's items and it is selected by the action of a mouse key, the menu for that item is displayed and an appropriate conventional menu action is taken based on further selections, etc. If the cursor is in one of the marking zones and a marking menu is selected by the action of the mouse key, the system performs appropriate marking menu actions (see for example, U.S. Pat. No. 5,689,667 incorporated by reference herein). Once the interaction is complete, the system removes 40 the zones and menu bars.

The preferred design of the interface 10 is depicted in FIG. 1. However, other designs are possible and these will be discussed below.

Figure 8:
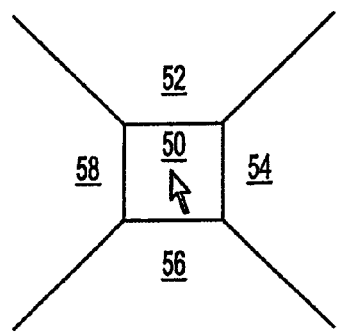
FIG. 8 shows the five marking menu zones of the present invention in an "x" cross.
Figure 9:
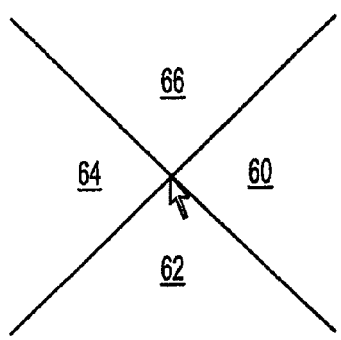
FIG. 9 shows four marking menu zones.
Figure 11:
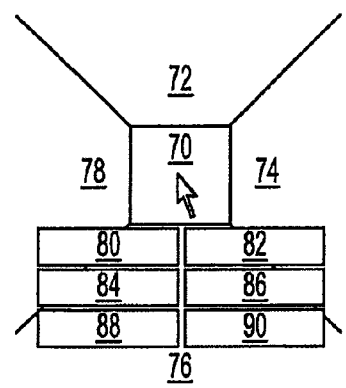
FIG. 11 illustrates overlapping zones according to the present invention.
Figure 10:
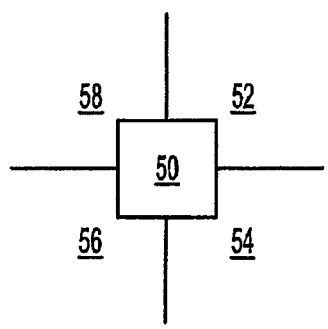
FIG. 10 shows a "+" cross shape.

The invention has one goal of increasing the number of the marking menus available to the user and capturing all the menu-items in complex applications such as animation packages. Traditionally, a user can access marking menus by holding down both the shift and ctrl key and pressing a mouse button to pop-up a marking menu. Each mouse button traditionally has a different marking menu associated with it. If the user configures each menu to have eight items, this results in fast access to 24 items. The present invention improves upon this situation by using the space-bar instead of the awkward "shift-control", produces the same menu for each mouse button (to avoid "wrong mouse button" errors and to support use with a tablet and stylus device instead of a mouse), and provides access to many more items. The zoned menu bar interface 10 of FIG. 1 is capable of presenting to the user more than 1200 menu items. The invention provides some of the large number of menu items by using different "menu zones" to access different menus as opposed to different mouse button or trigger keys. The invention preferably uses five zones 50-58 as shown in FIG. 8 (see also FIG. 1) arranged in an "x" cross pattern. Four zones 60-66 could also be used as depicted in FIG. 9. The cross pattern could also be arranged like a "+" cross pattern as depicted in FIG. 10 where the zones are arranged in quadrants. The center zone in FIG. 10 also need not be used like in FIG. 9. The invention could also have overlapping zones, such as the zones 70-90 as depicted in FIG. 11. The zoned menu bar interface 10 of FIG. 1 is a type of overlapping zoned interface where some of the zones are menu bars and some are marking menu zones. That is, the basic configuration of the interface 10 of the present invention is that of overlapping zones.

To organize a large number of menu items, the present invention defines a high-level meta-grouping of the commands by functional sets. For example, one grouping which is preferable for animation and 3D design applications is: Modeling, Animation, Dynamics, and Rendering. The grouping preferably follows the high level workflow of the particular software package users. A trade off with this grouping approach is that users may have to switch between command sets if the GUI cannot present all of the sets at once to the user. The traditional GUI menu bar at the top of the typical screen could not handle as many as 1000 commands. The present invention provides access to multiple menu bars and a means ("Hotbox Controls" 16/86—see FIG. 5) to switch between them. The traditional menu bar in the main window is implemented by having the common menu set (70 & 72) displayed followed by one of the functional sets (one of 76, 78, 80 & 82). Switching functional sets is accomplished by the pop-up menu containing the four functional task set names (see FIG. 5) which was traditionally located directly underneath the main menu bar. The concepts of functional sets, multiple menu bars, and switching between these is a guiding metaphor for the present invention.

To support learning, the interface 10 is designed to have the command set rows match the menu organizations in the traditional GUI menu bar.

Even though the interface 10 can house and present all of more than 1000 command functions to the user, users typically do not want to see all of the command sets all of the time. The interface 10, as previously mentioned, includes a special marking menu, the "Hotbox Controls" (see 86—FIG. 3) to allow the user to quickly toggle the visibility of individual rows or to specify the viewing of specific rows (which hides all other rows).

Besides the main menu bar, each of the application views and editors in a typical graphics application has an associated set of commands that work in the given view. The interface 10 provides access to these menus as well. The "pane specific" row (see 72 in FIG. 3) in the interface 10 changes its contents depending on the position of the cursor within different views at the time the interface 10 is invoked. This design provides context specific access to command sets which automatically change as the user changes views.

With the layout of the interface 10, there is a design tension between speed of access (making the menu rows tall and wide) versus the overall size of the interface 10 (which interferes with seeing the underlying application data). We know from Fitts' law (see Mackenzie & Buxton, (1992) Extending Fitts' Law To Two-dimensional Tasks. Proceedings Of ACM Chi '92 Conference On Human Factors In Computing Systems, 219-226.) that speed of target acquisition is a function of the distance to the target from the cursor and the width of the target menu bar. In the interface 10, the width of the target is broken up into two components: the length and height of the menu label. To provide fast access, the height of the menu rows is increased as compared to a regular menu bar which is the true effective width of the Fitts' Law targets of the invention while not distorting the visual appearance of the interface.

The invention uses a pop-up design, and two strategies could be used for the pop-up. First, the interface 10 could pop-up centered around the current cursor location. This preserves the relative locations of the menu rows and menu labels. Also, it guarantees that the center marking menu zone will be active for invoking a marking menu. Alternatively, the interface 10 could be popped up at a specified location, such as the center of the screen. This design would provide a constant, absolute positioning of menu items as well as marking menu zones. In terms of cursor travel distances, this alternative approach is more costly than the first approach where the menus come to the user instead of the user going to the menus. As a result, the first alternative is preferred.

Many pop-up interfaces are designed to dismiss themselves when a user selects an item. The interface 10 is designed to handle issuing multiple commands in a single posting by keeping the interface 10 displayed as long as the specific selection key (the space bar) is depressed and allowing the user to continue to select items. This provides a more efficient interaction (often saving mouse clicks and cursor travel time). Invoking multiple marking menus is also facilitated with this approach especially when working in a single marking zone.

The preferred interface defines five marking zones (north, south, east, west and center), as depicted in FIG. 3, to support quick access to a large number of commands. Within each zone, a marking menu set can be defined for each of the three mouse buttons. This provides the user with 15 marking menu sets for each zone. While this may seem a bit excessive, it is a reasonable size as users have a preference for single level menus. Less than 15 can be configured and typically five default marking menu sets, one for each of the zones is sufficient.

Figure 12:
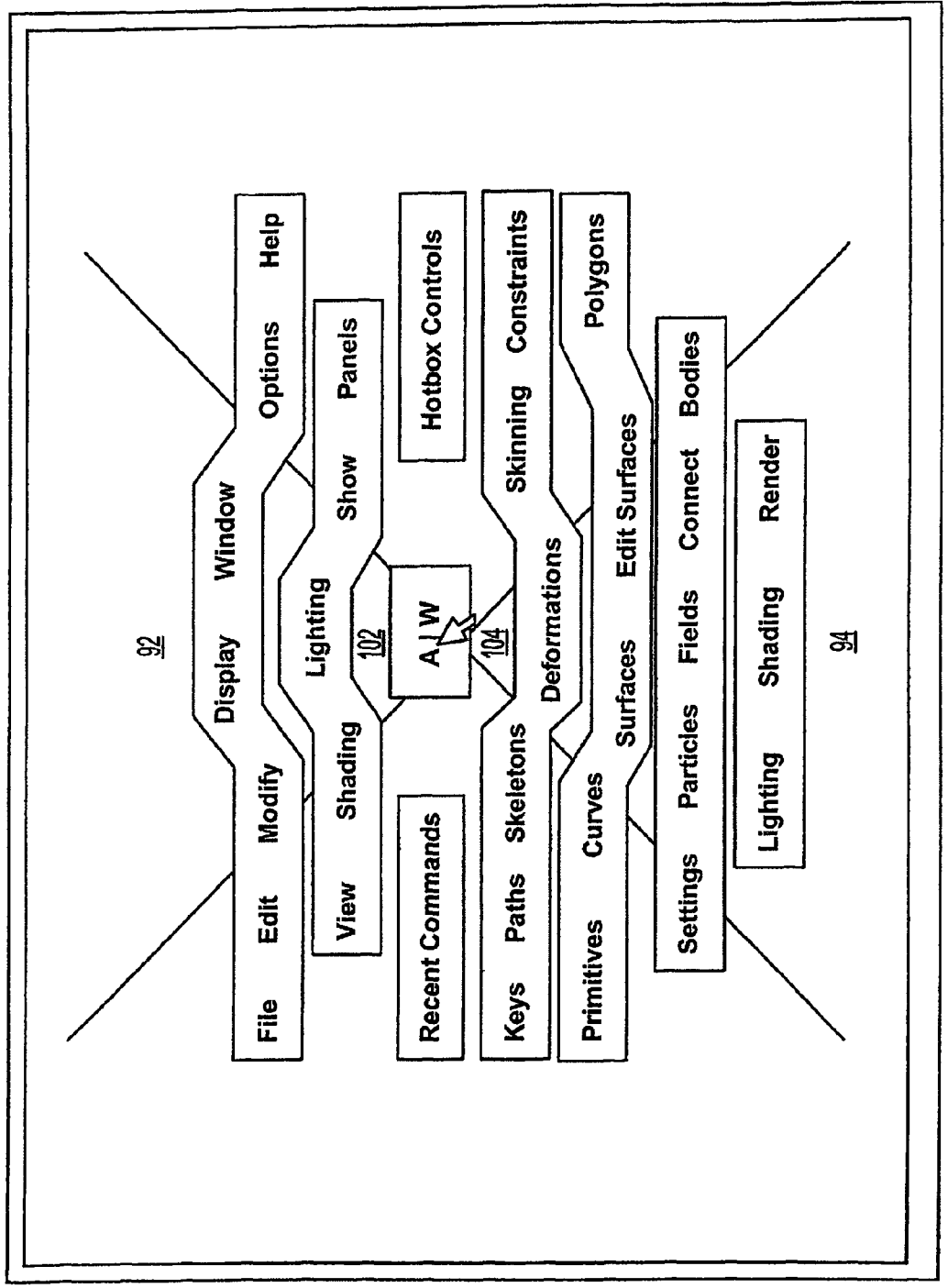
FIG. 12 depicts an alternate interface with additional north and south zone spaces produced by warping the menu bars.
Figure 13:
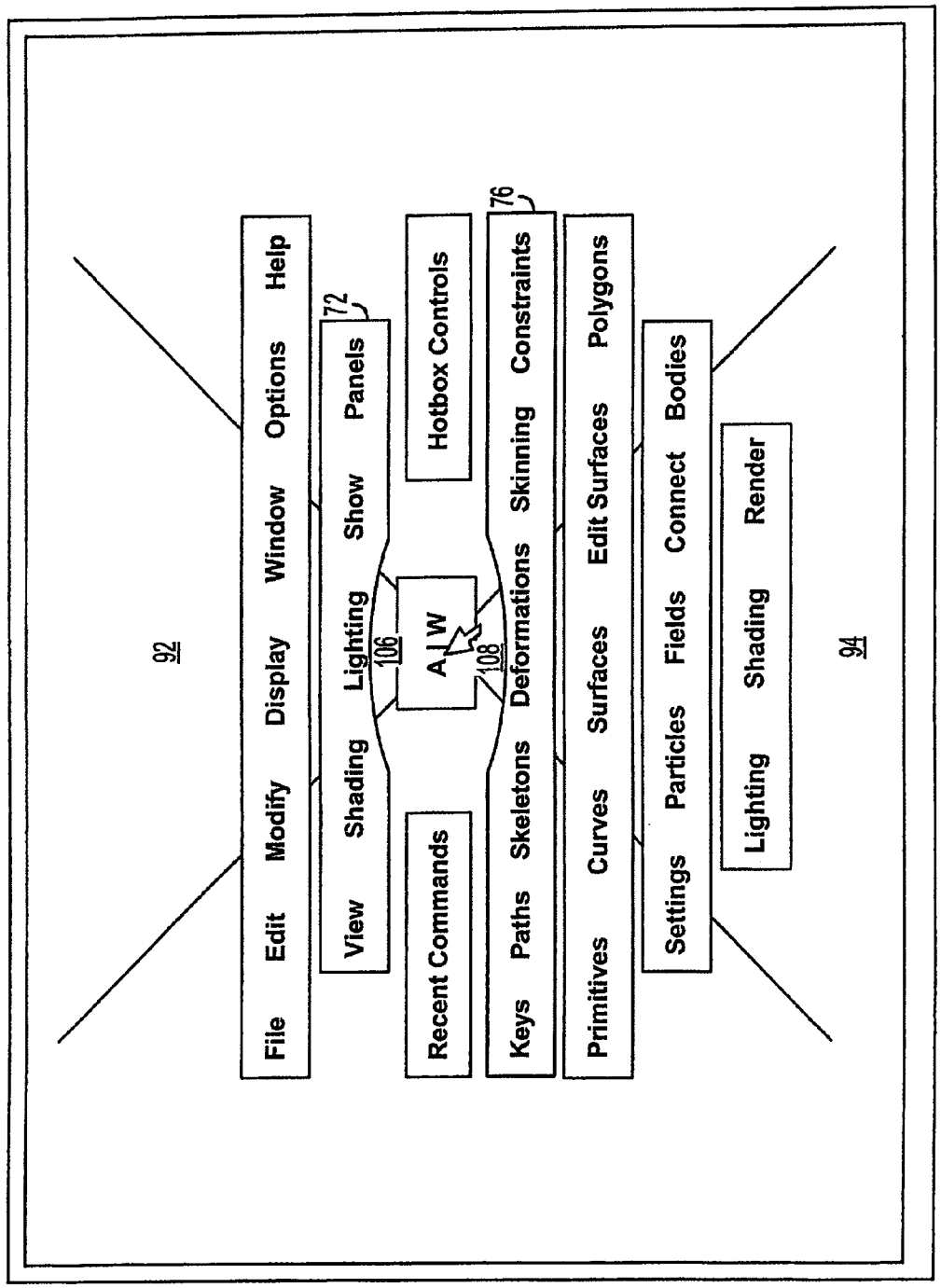
FIG. 13 depicts an alternate interface with additional north and south zone spaces produced by removing a portion of the inner most menu bars.

The center marking menu zone (see 90 in FIG. 3) has been designed for the quickest access as it does not require any cursor travel before a user can start issuing a mark. To reach the east 96 and west 98 zones quickly, a sufficiently large space is provided between the center zone 90 and the specific menu items 84 and 86, so that the cursor may easily and efficiently be positioned in the east and west zones. To reach the north 92 and south 94 zones, the user either has to carefully position the cursor between the menu bars in the north/south directions or mover the cursor beyond the menu bars in the north/south direction. This slows the access speed of the north/south marking zones as compared to the east west zones. To solve this problem the menu bars can be warped, as depicted in FIG. 12, to provide spaces 102 and 104 for accessing the marking menu zones 92 and 94. It is also possible to provide spaces 106 and 108 by carving away a portion of the menu bars 72 and 76 as depicted in FIG. 13.

The present invention provides "one-stop-shopping" for users where the commands are organized by function not by interaction style (e.g., moded tools are in the toolbox while one-shot actions are in the menus). Placing the tools into the menus has a side benefit of using text labels instead of icons to describe a command function.

To simplify the interaction model, the present invention defines a single mechanism for accessing the menus. It is possible to pop-up menus under the right mouse button, however, users typically find this fatiguing and want to use the left mouse button. The modifier keys (ctrl, alt, shift) are typically assigned as standard keys for managing selection and camera controls. The invention uses the space bar for its ease of access. Using a single key to access menus within the application provides gestural unification and simplification to the overall interaction model.

A variety of layouts can be considered for the menu sets (e.g., column based, cluster based, etc.). The invention uses a row based approach which offers a compact layout, and visually reflected the common menu bar concept.

Figure 14:
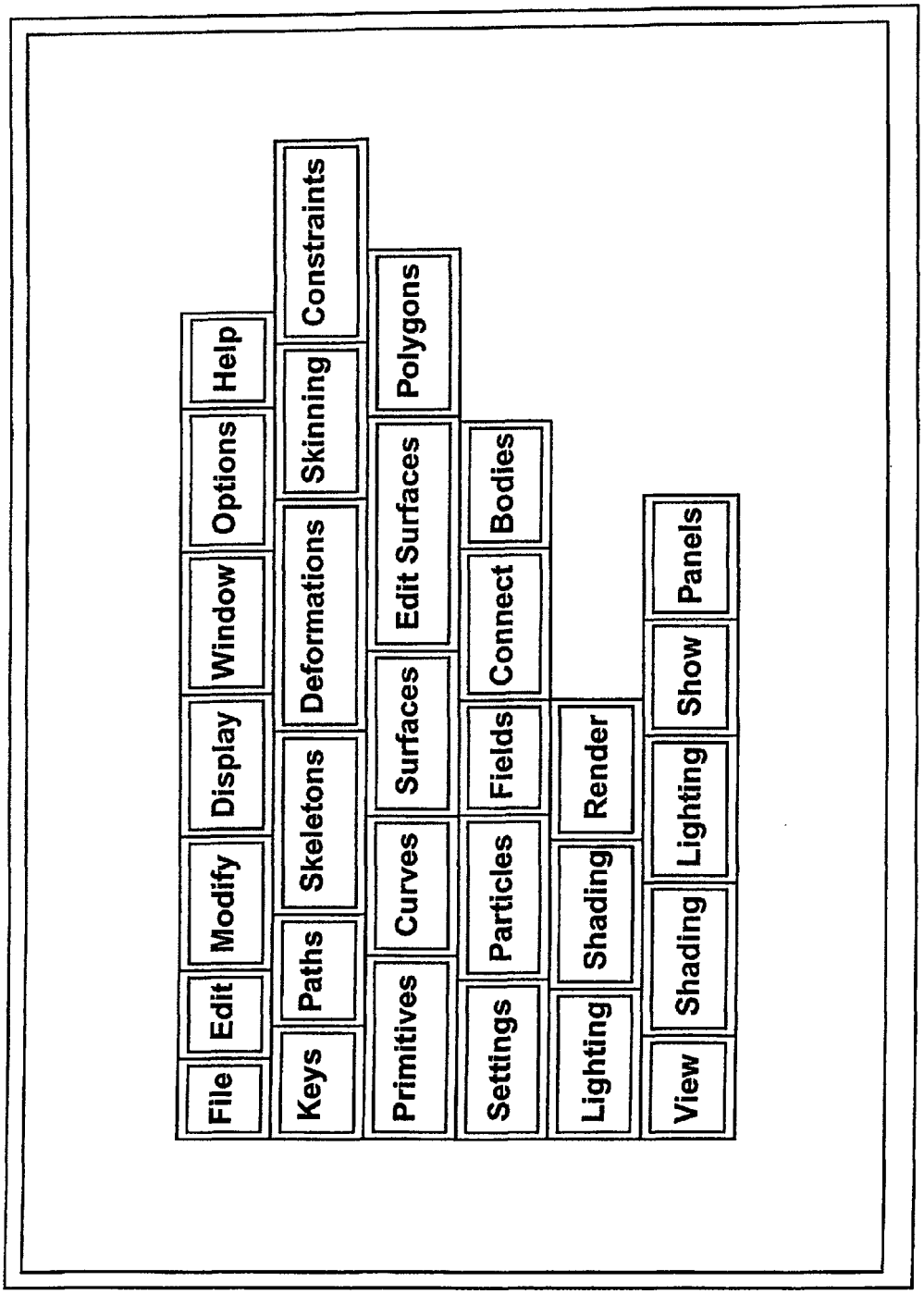
FIG. 14 illustrates an alternate arrangement of the menu bars.
Figure 15:
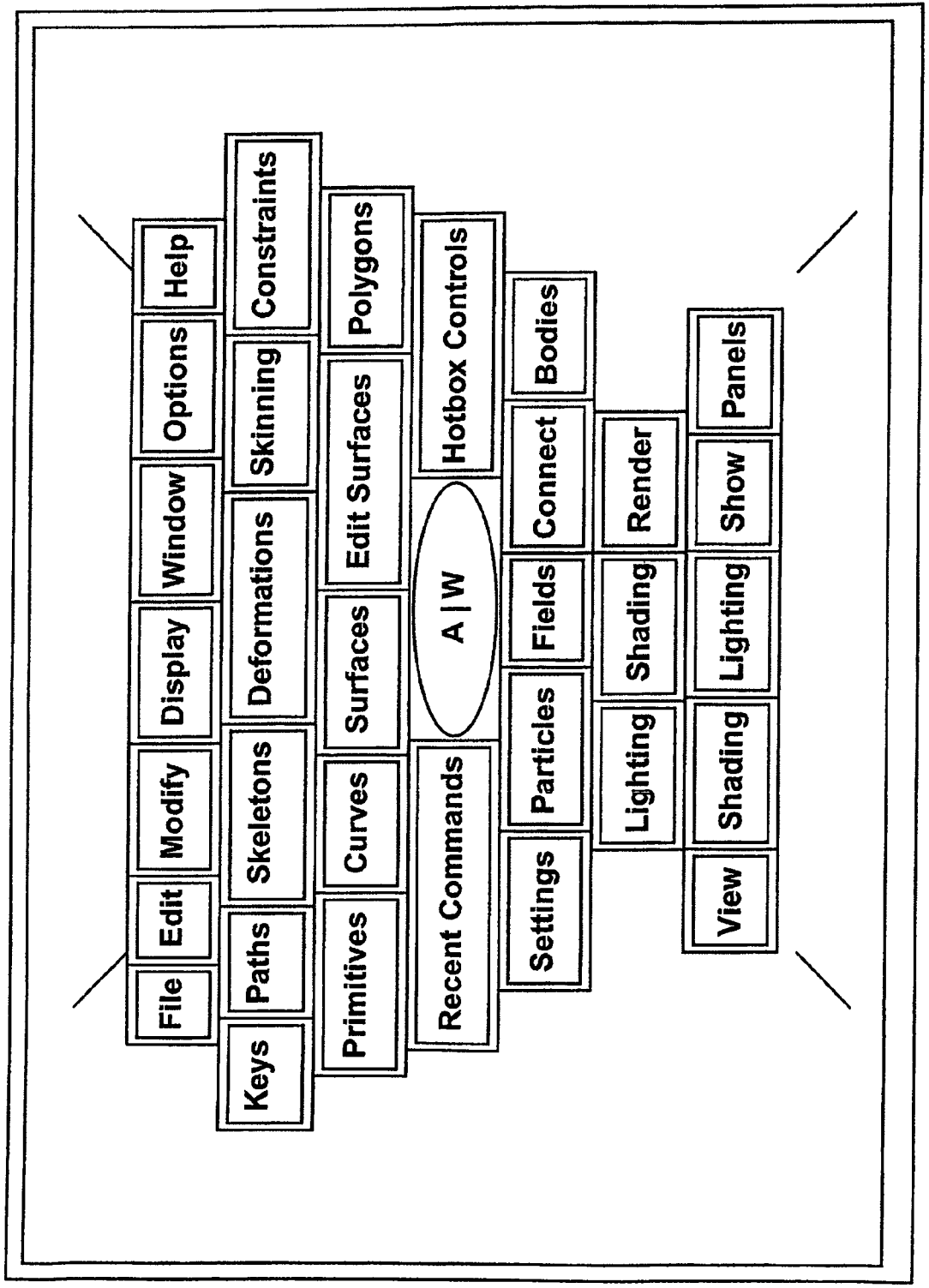
FIG. 15 shows a further alternate of the interface.
Figure 16:
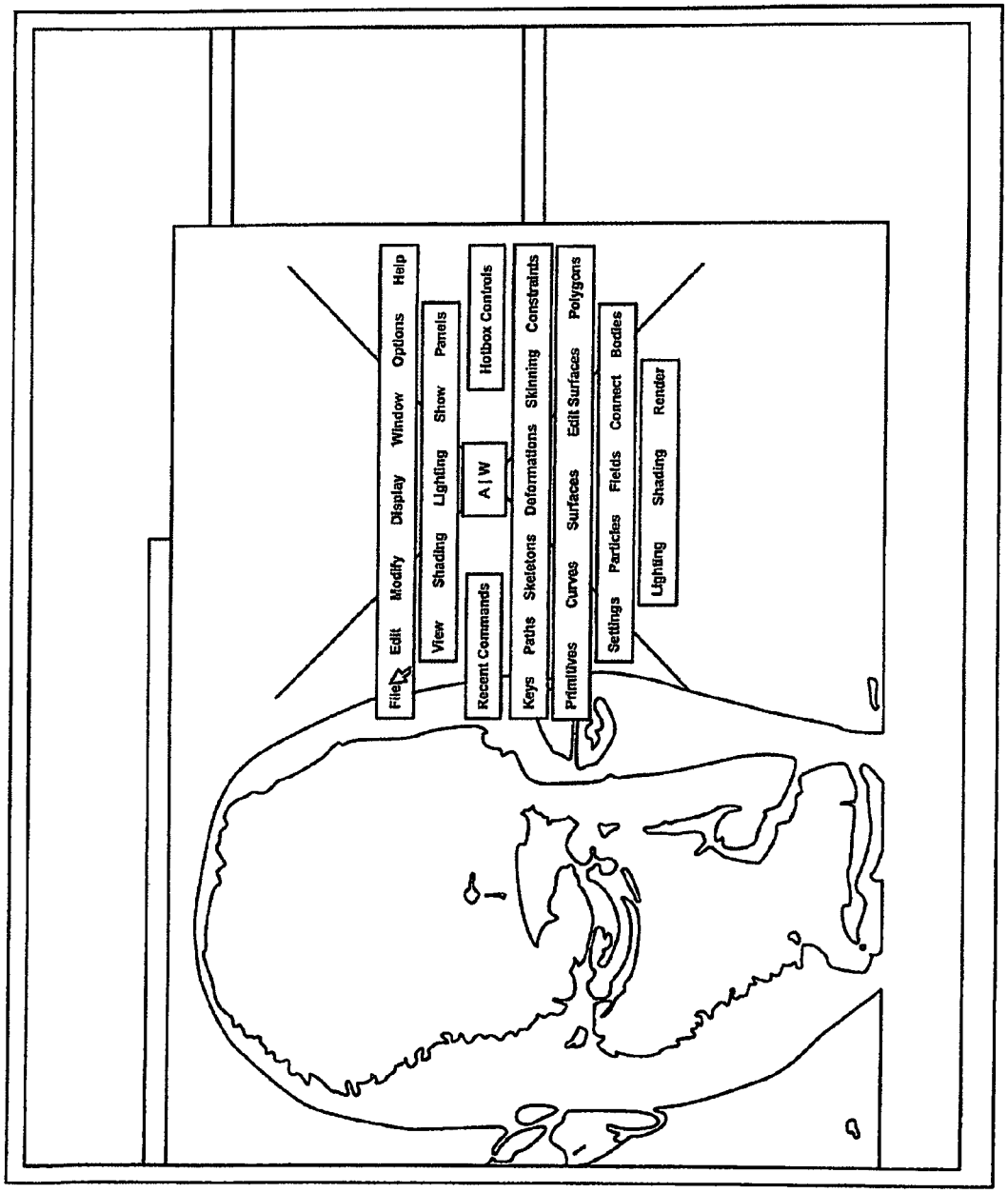
FIG. 16 depicts interface transparency.

The interface of the present invention provides a compact layout that visually reflects or mimics the menu bars. Presenting multiple menu rows to the user without overwhelming them is a major challenge. It is possible to present the rows left justified, as depicted in FIG. 14. However, a center justification approach reduces the travel distance to the various menus as depicted in FIG. 15. FIG. 15 also illustrates that the central zone need not be square but can be oval (or round). Graphically the center justification can be hard to visually parse and identify command sets based on row length. To help with this problem each menu bar row can be colored separately. However, some applications have only 3 colors available in the overlay window (which is the graphics image plane used to display the invention "over top" of the application window) and this limits this option for visual separation. Instead, the interface 10 is preferably laid out with an algorithm which is called "stair-step justify". In the approach, to give horizontal visual balance the number of and/or space occupied by the menu bars above and below the central zone 90 should be approximately the same. To attain vertical visual balance following algorithm is used:

```
Determine longest menubar (where length = total character width of all menubar items for a
given menubar plus a default inter-item spacing)
Mark longest menubar as Done
curLen = longest menubar length
stepSize = sizing constant (e.g., 25 pixels)
While all menubars are not Done {
    For each undone menubar {
        if (length menubar >= curLen – stepSize)
            Grow current menubar to curLen by adding spacing
            between
            menubar items
            Mark current menubar Done
    }
    curLen = curLen – stepSize;
}
Horizontally center all menubar rows relative to cursor position.
```

See the Appendix for more detail. This provides visual order to the interface 10, as depicted in FIG. 1. In addition, a border is placed around the rows to further reinforce their menu bar likeness and to reduce visual interference from the application data. The row ordering (Common, Pane specific, Interface specific, Animation, Modeling, Dynamics, Rendering) is preserved and the interface specific row 16 is made visually distinct to provide a visual grouping of rows.

The five marking menu zones are delimited by a cross (X) where the visual the length of the lines for the boundaries 36, 38, 40 and 42 (see FIG. 1) keeps the cross lengths balanced above and below the Hotbox specific row 74, such that the bounding box of the cross is a square. Other lengths produce noticeable visual distinctions that can be distracting.

To reduce the obscuring of the underlying application data, the interface 10 employs conventional transparency, as depicted in FIG. 17, to allow the user to see through the interface 10. This is especially useful as the interface 10 can be quite large when all of the rows are being displayed. The user can adjust the degree of transparency from fully opaque to clear.

When the interface 10 is drawn with 100% transparency (i.e., clear), a great deal of interference can occur between the textual menu labels and the underlying application data. To reduce this interference, the interface 10 uses conventional anti-alias fonts which surrounds each character with an "opposite" contrasting color to ensure its legibility.

Because the interface 10 is capable of showing all the traditional menu bars as well as any specialized ones needed by the user, the traditional GUI menu bars (both the main menu bar and the pane specific menu bars) can be hidden to free up more screen space for their application data. This can be a very significant saving in space if there are many windows displayed with a menu bar in each one.

When displaying the interface near the edge of the screen, the system does not warp the position of the interface 10 if portions of the fall off the screen. This is preserves the center marking menu zone. The menu bars themselves can be shifted to one side of the central zone as the edge of the screen is encountered.

The interface 10 can be viewed as a collection of menu bars and, as a result, users expect the same degree of functionality as traditional menu bars. Conventional menu bars provide functions of posting individual menus, browsing multiple menus within a single drag operation, the ability to tear-off menus, and offering roll-over help for individual menu items. The current embodiment of the invention does not provide all of these function but these functions could be easily added.

The present invention has been described with text descriptors being used within the menu bars. However, icons could be substituted for the text descriptors. The present invention has been described with respect to the menu bars being oriented horizontally. The bars could alternatively be oriented vertically or in any other type of layout that still reflects the conceptual relationships of menu bars and menu items to one another. Another variation is zones that change dynamically, e.g., the first time the hotbox pops up it has zones arranged in an "x". The next time it is displayed it has the zones arrange in a "+".

Zones don't have to be in a cross pattern; e.g., a series of vertical strips can be used. Other GUI elements or interaction can occur in the interface. For example, a GUI tool shelf could be displayed in addition to menu bars or the shelf could pop-up in a marking zone. Other interactions could take place in the zones: marks in a zone could be recognized by the system as handwriting, graphical sliders could appear in the zones; status information could appear in the zones. Ultimately any GUI interaction elements or element could be simultaneously displayed with the interface. A variation of this would be GUI elements that only display when the cursor is moved into a particular zone. Further, zones do not necessarily have to cover the entire screen. There could be gaps or holes between or in the zones to allow a user to click on data in the application windows underlying the interface.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

APPENDIX

```
Display Marking Menu Zones( )
---------------------------
Divide screen into zones based on cursor position
Display zone boundaries
Overlay Multiple Menu bars( )
---------------------------
Get list of active menu bar sets
Layout Menusets( )
Display menu sets according to layout
Layout Menusets( )
----------------
Determine longest menubar (where length = total character width of all
menubar items for a
given menubar plus a default inter-item spacing).
Mark longest menubar as Done
curLen = longest menubar length
stepSize = sizing constant (e.g., 25 pixels)
While all menubars are not Done {
    For each undone menubar {
        if (length menubar >= curLen – stepSize)
            Grow current menubar to curLen by adding spacing
            between
            menubar items
            Mark current menubar Done
    }
    curLen = curLen – stepSize;
}
Horizontally center all menubar rows relative to cursor position
Vertically position hotbox utility "center row" at cursor position.
rowCount = 1;
For all active menubars {
    if (menubar = "Common") {
        if (pane specific menubar is active)
            vertically position menubar 2 rows above center row
        else
            vertically position menubar 1 row above center row
    }
    else if (menubar = pane specific)
        vertically position menubar 1 row above center row
    else {
        vertically position row rowCount below center row
        rowCount = rowCount + 1;
    }
}
Handle Interaction( )
--------------------
While trigger key down {
    if (mouse key pressed)
        if (mouse cursor over menubar)
            perform menu selection interaction for menubar item
            under cursor
        else
            perform interaction for the zone under cursor
}
```

What is claimed is:

1. A display, comprising:
a pop-up graphical user interface displayed, by a computer, at a current position of a cursor when a keyboard space bar is held down, said interface comprising:
marking menu zones arranged in an "x" cross where a marking menu is activated when a mouse button is held down, said zones comprise a central zone positioned under the current cursor position and outer zones having zone boundaries between said zones delineated by lines of equal length forming a square; and
menu bars overlapping the zones where a menu is displayed when a menu bar menu item is selected, said menu bars being arranged around said central zone, said menu bars are arranged from top to bottom on both sides of said central zone in a stair-step pattern with items spaced to fill the bars where text of said menu mars comprises an anti-aliasing font, said menu bars comprising:

common menu bars positioned above the central zone;
task menu bars positioned below the central zone; and
an interface specific menu bar positioned beside the central zone.

2. A display system, comprising:
a cursor control and selection input device;
a keyboard having an activation key;
a display;
a computer coupled to said input device, said keyboard and said display, producing a zoned menu bar graphical user interface positioned relative to a screen space of said display when the activation key is held down and selecting from the interface using the input device by activating a menu item associated with one of menu zones displayed on the screen space when an input identifies said one of menu zones that are overlapped by menu bars to be selected.

3. A non-transitory computer readable medium having stored therein a process to cause a computer to execute an operation, comprising:

displaying, by the computer, marking menu zones in which marking menus are enabled to be activated; and
producing menu bars with menu items overlapping the zones with menus activatable by selection of one of the items, where the menu items are displayed at a position relative to a screen space of a display, a menu item associated with one of menu zones displayed on the screen space is activated when an input identifies said one of menu zones that are overlapped by menu bars to be selected.

4. The computer-readable medium as recited in claim 1, wherein said producing comprises:

creating menu bars with a bottom to top stair-step pattern; and
filling each menu bar with the commands of that menu bar by left and right justifying the menu items.

5. A process of displaying a menu interface, comprising:
detecting, by a computer, a depression of a single key of a keyboard; and
displaying the menu interface under a current position of a cursor, where the menu interface has menu items displayed at corresponding positions relative to a screen space of a display, one of the menu items associated with menu zones displayed on the screen space is activated when an input identifies one of the menu zones that are overlapped by menu bars.

6. A display system, comprising:
a cursor control and selection input device;
a keyboard having an activation key;
a display;
a computer coupled to said input device, said keyboard and said display, producing a zoned menu bar graphical user interface positioned relative to a screen space of said display when the activation key is held down and selecting from the interface using the input device, and
wherein menu zones having a central zone positioned under a current position of a cursor and outer zones having zone boundaries between said zones delineated by lines of equal length forming a square are provided, and
menu bars overlapping the zones are provided where a menu is displayed when a menu bar menu item is selected, said menu bars are arranged around said central zone from top to bottom on both sides of said central zone in a stair-step pattern with items spaced to fill the bars where text of said menu mars comprises an anti-aliasing font.

* * * * *